United States Patent
Kenderov (10) Patent No.: US 7,779,028 B1
(45) Date of Patent: Aug. 17, 2010

(54) SYSTEM, METHOD AND COMPUTER PROGRAM PRODUCT FOR COMMUNICATING INFORMATION AMONG DEVICES

(75) Inventor: Stoyan Kenderov, San Francisco, CA (US)

(73) Assignee: Amdocs Software Systems Limited, Dublin (IE)

( * ) Notice: Subject to any disclaimer, the term of this patent is extended or adjusted under 35 U.S.C. 154(b) by 256 days.

(21) Appl. No.: 11/416,962

(22) Filed: May 2, 2006

(51) Int. Cl.
*G06F 17/30* (2006.01)

(52) U.S. Cl. ............ 707/769; 707/770; 707/781; 707/E17.014; 707/E17.029; 707/E17.032

(58) Field of Classification Search ............ None
See application file for complete search history.

(56) References Cited

U.S. PATENT DOCUMENTS

| | | | |
|---|---|---|---|
| 6,356,971 B1 * | 3/2002 | Katz et al. .......... | 710/301 |
| 7,178,106 B2 * | 2/2007 | Lamkin et al. .......... | 715/716 |
| 2001/0039546 A1 * | 11/2001 | Moore et al. .......... | 707/10 |
| 2001/0055951 A1 * | 12/2001 | Slotznick .......... | 455/41 |
| 2002/0198962 A1 * | 12/2002 | Horn et al. .......... | 709/218 |
| 2003/0135513 A1 * | 7/2003 | Quinn et al. .......... | 707/102 |
| 2004/0019497 A1 * | 1/2004 | Volk et al. .......... | 705/1 |
| 2004/0028079 A1 * | 2/2004 | Noetsele .......... | 370/486 |
| 2004/0073915 A1 | 4/2004 | Dureau .......... | 725/9 |
| 2005/0235036 A1 * | 10/2005 | Nielsen et al. .......... | 709/206 |
| 2005/0246757 A1 * | 11/2005 | Relan et al. .......... | 725/135 |
| 2006/0218629 A1 * | 9/2006 | Pearson et al. .......... | 726/8 |
| 2006/0271971 A1 * | 11/2006 | Drazin .......... | 725/86 |
| 2007/0174237 A1 * | 7/2007 | Wilbrink et al. .......... | 707/3 |

FOREIGN PATENT DOCUMENTS

| | | |
|---|---|---|
| WO | 02/09423 | 1/2002 |
| WO | 03/079271 | 9/2003 |

* cited by examiner

*Primary Examiner*—Don Wong
*Assistant Examiner*—Andalib F Lodhi
(74) *Attorney, Agent, or Firm*—Zilka-Kotab, PC (57) ABSTRACT

A system, method, and computer program product are provided for communicating information among devices. In use, content is presented utilizing a first device. In one embodiment, a request for information associated with the content may then be received utilizing the first device. To this end, the requested information may be sent to a second device other than the first device. In another embodiment, a request for a contact associated with the content may be received utilizing the first device. Thus, in response to the request, contact may be established with the second device in regards to the content.

15 Claims, 5 Drawing Sheets

SYSTEM, METHOD AND COMPUTER PROGRAM PRODUCT FOR COMMUNICATING INFORMATION AMONG DEVICES

BACKGROUND AND FIELD OF THE INVENTION

The present invention relates to information distribution, and more particularly to communicating information among various devices.

SUMMARY

A system, method, and computer program product are provided for communicating information among devices. In use, content is presented utilizing a first device. In one embodiment, a request for information associated with the content may then be received utilizing the first device. To this end, the requested information may be sent to a second device other than the first device. In another embodiment, a request for a contact associated with the content may be received utilizing the first device. Thus, in response to the request, contact may be established with the second device in regards to the content.

DETAILED DESCRIPTION

Figure 1:
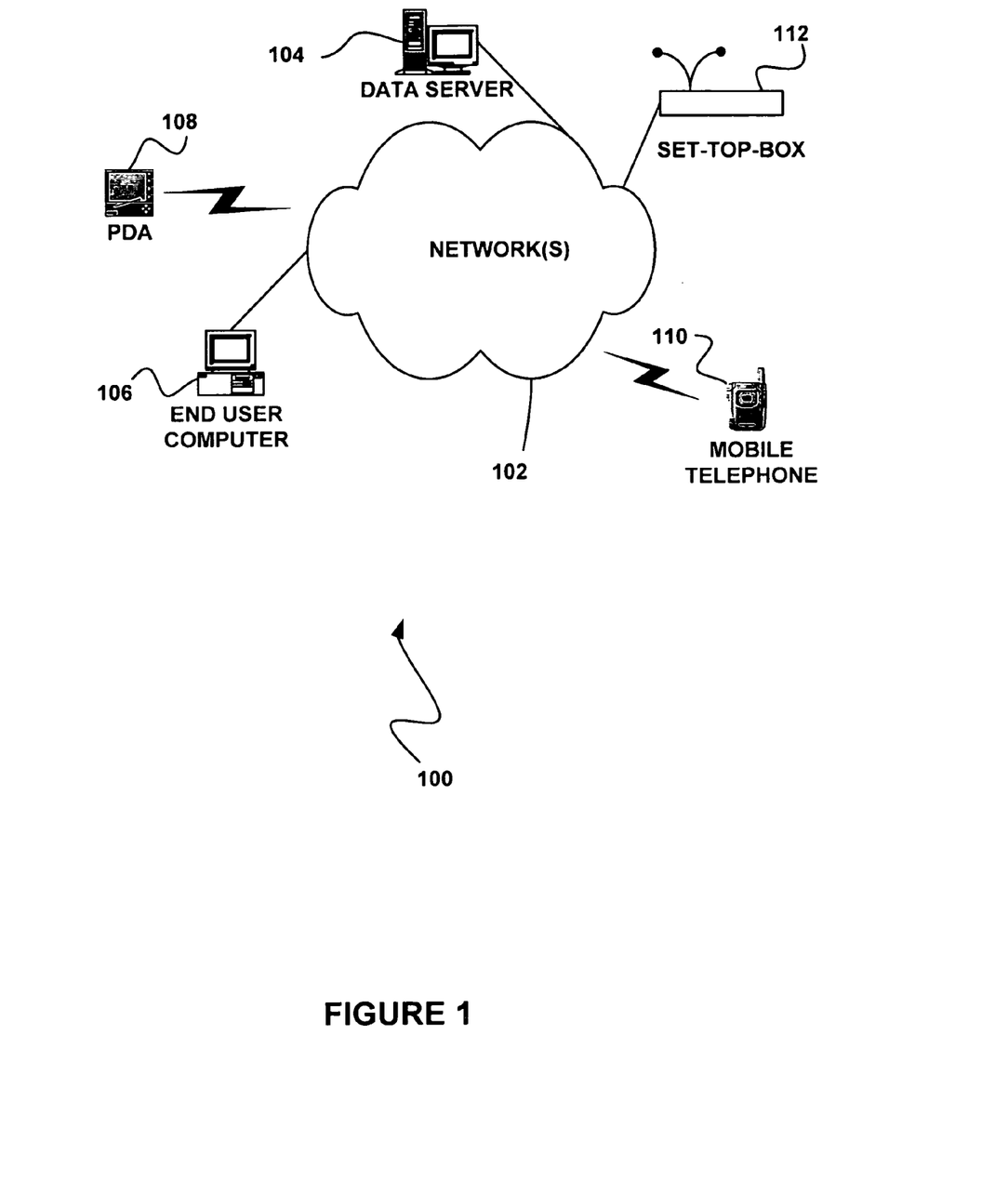
FIG. 1 illustrates a network architecture for communicating information between a plurality of devices, in accordance with one embodiment.

FIG. 1 illustrates a network architecture 100 for communicating information between a plurality of devices, in accordance with one embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television and/or associated set-top box 112, etc. Of course, other devices such as conventional radios, satellite radios, etc. are also contemplated.

It should be noted that any of the foregoing devices in the present network architecture 100, as well as any other unillustrated hardware and/or software, may be equipped with the capability of communicating information between a plurality of devices. Specifically, during use, content may be presented (e.g. displayed, via audio, etc.) utilizing a first device.

In one embodiment, such content may optionally include interactive content. In addition, the content may include television content, such as for example, television shows and/or television advertisements. Specifically, the content may include interactive television (iTV) content. As another option, the content may include web content, capable of being presented over a network. Of course, in the context of the present description, the content may include any type of content capable of being presented to a user.

Still yet, in various embodiments, the first device utilized to present the content may include any device, such as, for example, the devices described above (e.g. a data server, an end-user computer, a PDA, a mobile telephone, a television and/or set-top-box, any combination of hardware and/or software, etc.). For example, the device may include an iTV. Furthermore, the iTV may include any form of a television device that allows a user to control delivery of content and to choose television content beyond the degree available in traditional broadcast television services, where a user can only switch between available channels, etc. For instance, the iTV may provide digital television content capable of being accessed and/or modified on-demand. The device may also include a portable television device, such as for example, a digital video broadcast-handheld (DVB-H) capable terminal, a media forward link only (MediaFLO) capable terminal.

Also during use, a request for information associated with the content may be received utilizing the first device. In various embodiments, such request may be initiated by any command, including a user-initiated command. For instance, the request may be initiated utilizing a remote control associated with a television and/or set-top-box.

Such set-top-box may include, for example, any device capable of interfacing between a broadcasting system and device. As an option, the set-top-box may be connected to a television or located within a television. In addition, the set-top-box may receive broadcast or unicast television content from a broadcast system, transcode signals between the broadcast system and a display device (e.g. television, video display, etc.), capture user commands, provide digital guides or menus to the display device, and/or any other functionality capable of being performed by such an interfacing device.

In another instance, the aforementioned request for information may be initiated utilizing keys, controls, etc. located on the television and/or set-top-box. In still yet another instance, the request may be initiated utilizing a wireless and/or wired keyboard in communication with the television and/or set-top-box. In any of such instances, the request may be initiated by manipulating any pre-defined controls. Furthermore, in other embodiments, the request may be initiated by a voice command capable of being received by a voice recognition system. Of course, any desired manner of receiving a request may be utilized.

In various embodiments, the requested information may include any information capable of being associated with the content. Just by way of example, the requested information may include a request for information on a good and/or service displayed within television content. Specifically, the requested information may include information associated with a particular good and/or service presented within a television show and/or a television advertisement.

In another particular example, the requested information may include a request for a map of a location displayed within the content. In another particular example, the requested information may include a request for a brand and/or a location where a particular good displayed within the content can be purchased. Still yet, the request may include additional information on where the requested information is to be sent.

For example, the request may provide recipient data including an e-mail address, a telephone number, an internet protocol (IP) address and/or any other data capable of identifying a recipient. In addition, the request may include formatting information identifying a format in which the information is to be received. Such format may optionally include a short message service (SMS) format, a text format, a hypertext transfer protocol (HTML) format, a uniform resource locator (URL) link to the information, a web page bookmark format, a telephone call format, and/or any other format capable of providing the requested information.

Just by way of example, the requested information may include a request to be contacted by a person associated with the content. For instance, the request may be for a phone call and/or e-mail to be received from a person associated with the content (e.g. a sales representative of an advertisement, etc.). Furthermore, the requested information may include a request to receive an e-mail containing the information, a request to receive an SMS message containing the information at a mobile telephone, a request to receive a bookmark placed on a web browser that links to the information, and/or any other type of request capable of prompting the information to be received.

Additionally, the requested information may be received at any device capable of receiving a request and processing the request. In one aspect, the requested information may be received over a network (e.g. the Internet, etc.). For instance, the information may be received at a server capable of identifying information, within a database, associated with the request. Of course, as another option, the information may simply be received and processed at a set-top-box.

Once the requested information is received utilizing the first device, the requested information may then be sent to a second device. The second device may include any of the devices described above. Still yet, the first and second devices may include the same, similar, or different types of devices. In the context of the present description, the second device may include any device capable of receiving and/or presenting the requested information.

In one optional embodiment, the first device and the second device may optionally be connected utilizing a network. The requested information may thus be sent to the second device in any desired manner, including but not limited to, e-mail, SMS, and a telephone call. In this way, information associated with content may be requested utilizing the first device and sent to the second device. More information regarding such capability will be set forth hereinafter in greater detail during reference to subsequent figures.

More illustrative information will now be set forth regarding various optional architectures and uses in which the foregoing architecture 100 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
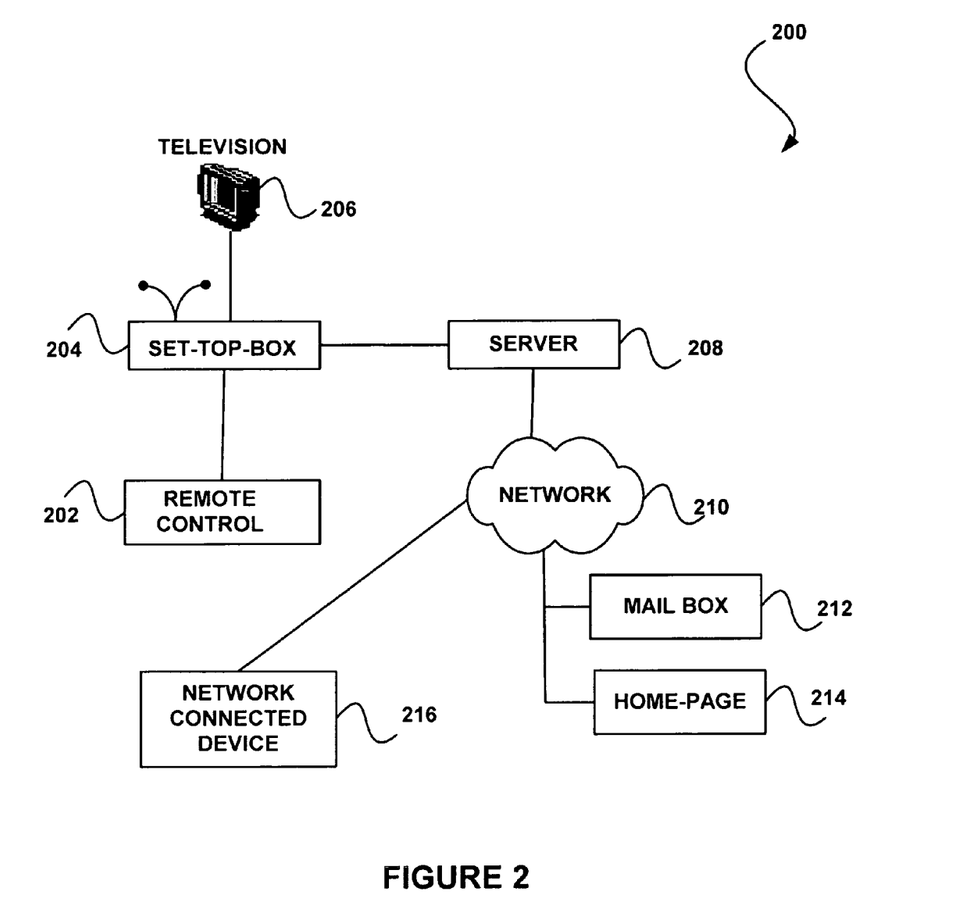
FIG. 2 illustrates an architecture for communicating information in association with a television and a network connected device, in accordance with another embodiment.

FIG. 2 illustrates an architecture 200 for communicating information in association with a television and a network connected device, in accordance with another embodiment. As an option, the architecture 200 may be implemented in the context of the details of FIG. 1. Of course, however, the architecture 200 may be carried out in any desired environment. Further, the aforementioned definitions may equally apply to the description below.

Initially, a television 206 displays content to a user. The television may optionally display content to the user utilizing a set-top-box 204. As shown, a request for information associated with the content is received at the set-top-box 204 from the user utilizing a remote control 202.

As an option, the set-top-box 204 may generate meta-data based on the request. Such meta-data may include an information code, a content title, a time of the request made by the user, a relative time from a start of the content when the request was made by the user, a model of the set-top-box 204, a user configuration, user contact information [e.g. a preferred e-mail address of the user, an Internet protocol (IP) address of the user's computer, an IP address of a web-based bookmarking service, etc.], and/or any other information capable of being associated with the user request. In one specific embodiment, the user configuration may include a format for which the information is to be received, a device to which the information is to be sent, and/or any other options capable of being configured by the user.

The set-top-box 204 may then send the request to a server 208 for processing. In use, the set-top-box 204 and/or the server 208 may be in communication with an IP network 210. If the request is in the form of meta-data, the server 208 may identify the request utilizing the meta-data.

The server 208 may further process the request using predetermined operations. For example, the server 208 may manipulate, transcode and/or enhance the received request. Specifically, in one embodiment, the server 208 may perform such operations on the request utilizing additional information. Such additional information may be derived from results of a search (e.g. an Internet search, a database query, etc.), a user submission, a user configuration stored on the set-top-box 204, and/or may also be located in a user database accessible by the server 208. Furthermore, the additional information may be stored on the server. In this way, the server 208 may identify the information requested, and satisfy the received request with such information.

In addition, the server 208 may retrieve optional relevant information from other electronic sources through queries or searches, and add such information to the requested information. Such optional relevant information may include, for example, a URL that the user can store as a bookmark in a web browser and/or any other data not specifically requested by the user. The optional relevant information may be included with the requested information based on a default configuration on the server 208, information (e.g. a user profile, etc.) in the user database, information within the received request, and/or utilizing any other method of identifying a threshold of relevant information to be included with the requested information. To this end, the requested information may be enhanced by the relevant information.

The server 208 then identifies recipient data including an e-mail address, a telephone number, an internet protocol (IP) address and/or any other data capable of identifying a recipient device. Of course, any number of recipients may be identified, such that the user may receive the requested information at multiple devices and/or addresses. For example, the recipient data may be identified within the request received at the server 208 or may be identified by querying the user database, but, of course, could be identified utilizing any method capable of identifying recipient data.

Such recipient data may then be used to send the requested information to the user. The server 208 may also identify format data for the requested information in a manner similar or the same as the manner in which the recipient data is identified. Utilizing such recipient data and format data, the requested information may be sent to the user. Specifically, the requested information and any relevant information may be sent to the user in an appropriate, and even user-requested, format.

In one specific example, the recipient data may identify the recipient as being an e-mail address. Further, the format data may identify the format of the data as being a hypertext markup language format (HTML). Therefore, the requested information, in such embodiment, may be sent via e-mail to an electronic mail box 212, where such e-mail contains the requested information in an HTML format. Of course, the format may include any desired format. For instance, the e-mail may contain a uniform resource identifier (URI). In this way, the user may save the URI in a bookmarks list of a web browser.

In another example, the recipient data may identify the recipient as being a web page, such that the requested information may be sent to a home page 214. For instance, the requested information may be sent to the home page 214 in the form of a bookmark, such that a link to the requested information may be stored within the web browser associated with the home page 214. As another option, if the recipient data is an IP address of a computer, and the format data is a URI, the server 208 may store the URI in a list of bookmarks located on the computer with such IP address. Optionally, a bookmark registration program may be executed on the computer associated with the IP address and/or on the server 208. Of course, the recipient data may identify any device in communication with the server 208 via the network 210 for transmitting the requested information.

Still yet, the requested information may be stored within a document on the server 208. In this way, devices connected to the network 210 may retrieve such document from the server 208. For instance, the server 208 may send a link for a document to an identified recipient, such that the recipient device may retrieve the requested information utilizing the link. The document may include any type of document capable of providing the requested information (e.g. XML document, HTML document, text document, etc.).

Of course, it should be noted that any and/or all of the functionality described above with respect to the server 208 may optionally be performed by the set-top-box 204, as will be described below in more detail (or any other device, for that matter, etc.). In addition, the set-top-box 204 and the server 208 may perform identical functions and/or complementary functions. Just by way of example, and not by limitation, the set-top-box 204 may optionally manipulate, transcode and/or enrich the request to include the requested information that satisfies the request. The set-top-box 204 may also send the data to the recipient device.

In addition, the set-top-box 204 may provide an on-line bookmarks list service that can be viewed or retrieved automatically by the network 210 connected device, such as for example via a hypertext transfer protocol (HTTP) request, or that may be syndicated via really simple syndication (RSS) requests. An external on-line resource, such as the user homepage 214 or an on-line bookmarks service may synchronize with the bookmark list maintained by the set-top-box 204. The set-top-box 204 may even request from the server 208 additional information and include such additional information in the requested information it sends to the user, where such additional information includes any of the information described above with respect to the server 208.

The set-top-box 204 may also put the requested information in a document and store such document for recipient devices to retrieve from the set-top-box 204, in much of the same manner described above with respect to the server 208. The set-top-box 204 may also store the requested information sent to the recipient devices until manually or automatically deleted. Thus, as described above, the server 208 and/or set-top-box 204 may allow a network connected device 216 to receive requested information associated with content displayed on a television 206.

In one specific example, a user may view a television show on a television. The user may then request information associated with the television show, such as a location where a good displayed on the television show may be purchased. The request may be sent from a set-top-box associated with the television to a server. Based on the request, the server may identify the requested information and/or any additional information that may be relevant to the particular television show and/or good. The server may then send the requested information and/or any of the additional relevant information to an identified recipient.

For instance, an e-mail may be sent to the user's e-mail address, where the e-mail includes information on a particular scene that was shown when the request was made, a sequence of scenes that were shown during a predefined period of time during which the request was made, a movie associated with the television show, the actors in the television show, an advertisement associated with the television show, product information associated with products in the television show, coupons associated with the television show, and/or any other information capable of being associated with the television show.

In another specific example, a user may request information on a location shown in a television show. A server that receives the request may identify a map associated with the location. As requested by the user, the map may be sent from the server to the user's mobile telephone and/or to the user's computer. As another option, the map may be stored on the server and a link to the map may be sent to the user.

In yet another example, while viewing a television advertisement, a user may request to be contacted with a representative associated with the television advertisement. The request may be sent to a server, and the server may identify the requested representative. The server may then establish a phone call between a designated telephone of the user and the identified representative.

Figure 3:
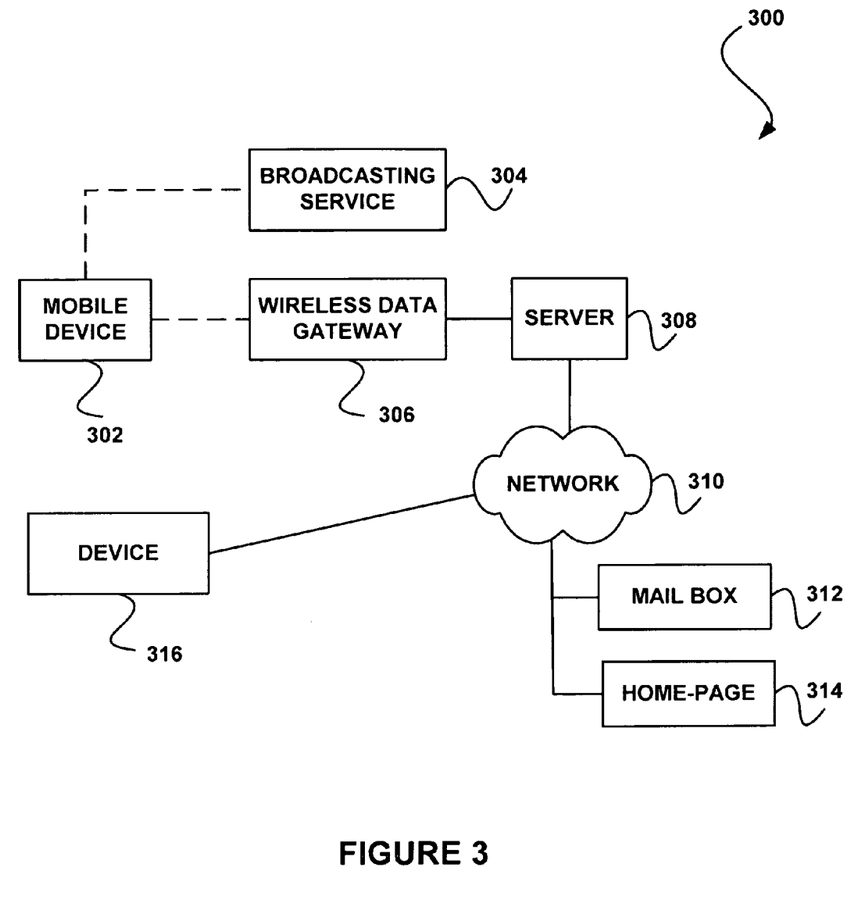
FIG. 3 illustrates an architecture for communicating information in association with a mobile device and a network connected device, in accordance with yet another embodiment.

FIG. 3 illustrates an architecture 300 for communicating information in association with a mobile device and a network connected device, in accordance with yet another embodiment. As an option, the architecture 300 may be implemented in the context of the details of FIGS. 1 and/or 2. Of course, however, the architecture 300 may be carried out in any desired environment. Again, the aforementioned definitions may equally apply to the description below.

As shown, a mobile device 302 receives and presents broadcasted content from a broadcasting service 304. The broadcasting service 304 may include a DVB-H service, a MediaFLO service, and/or any other broadcasting service capable of broadcasting content to a mobile device 302.

Thereafter, the mobile device 302 receives, from a user of the mobile device 302, a request for information associated with the content. The mobile device 302 may then transcode the request into meta-data capable of being read by the server 308.

The meta-data is subsequently sent to the server 308 utilizing any desired transport protocol. Optionally, the meta-data may be sent to the server 308 utilizing an intermediary transport service. Such intermediary transport service may be based on a SMS, an integrated digital enhanced network (IDEN), general packet radio service (GPRS), code division multiple access (CDMA), IS-95A/B, wideband code division multiple access (WCDMA), WiMAX, wireless fidelity (WiFi), and/or any other protocol supported by the mobile device 302 that directly or through proxies may allow the meta-data to be sent to an intermediate network connected computer 306 (e.g. SMS gateway, IDEN gateway, etc.) prior to being sent to the server 308.

Thereafter, the server 308 receives the meta-data and enriches, enhances and/or substitutes the metadata for the requested information. The requested information may then be sent to an identified recipient utilizing a network 310. Such identified recipient may include an electronic mail box 312, a web page 314, and/or any device 316 connected to the network 310 that is capable of receiving the requested information.

In addition, the server 308 may use the transport protocols described above to accomplish this task. Of course, however, the server 308 may use any desired transport protocol capable of delivering the requested information to the identified recipient. In this way, information associated with content viewed on a mobile device may be requested and received at a designated recipient device.

In one specific example, a user may view a video broadcast on a mobile device. The user may then request additional information to be sent to his e-mail, be syndicated with his/her Internet home-page, and/or that a URI associated with the video content be bookmarked for later viewing on his/her mobile device browser, on the browser of another designated Internet connected device, and/or on an on-line bookmarks list. The user may issue the request by pressing a button on the mobile device, by speaking a command in a natural voice into the mobile device, and/or by any other method capable of being identified by the mobile device. The request may then be sent to a server, and the server may identify the requested content. Such requested content may then be transmitted to an identified recipient.

In another example, based on a video broadcast displayed on a mobile device, a user may request to speak to a representative associated with the content of the video broadcast. The request may be sent to the server, and the server may identify a phone number of the requested representative. Furthermore, the server may send the identified phone number to the mobile device, or may optionally initiate a call between the mobile device and the representative. The server may use a session initiation protocol (SIP) such as the SIP used by an IP multimedia subsystem (IMS). In this way, the server may act as a proxy of the established call or may optionally limit its role only to the signaling, establishing and/or controlling of the call between the mobile device and the representative.

As still yet another example, a user may view video content on a mobile device which requests viewers to vote on data associated with the content. The user may request a vote be made by pressing predefined keys associated with the mobile device or may speak the request into the mobile device. The mobile device may then send the request to vote to the server, and the server may send information associated with the vote to a user-defined recipient.

Figure 4:
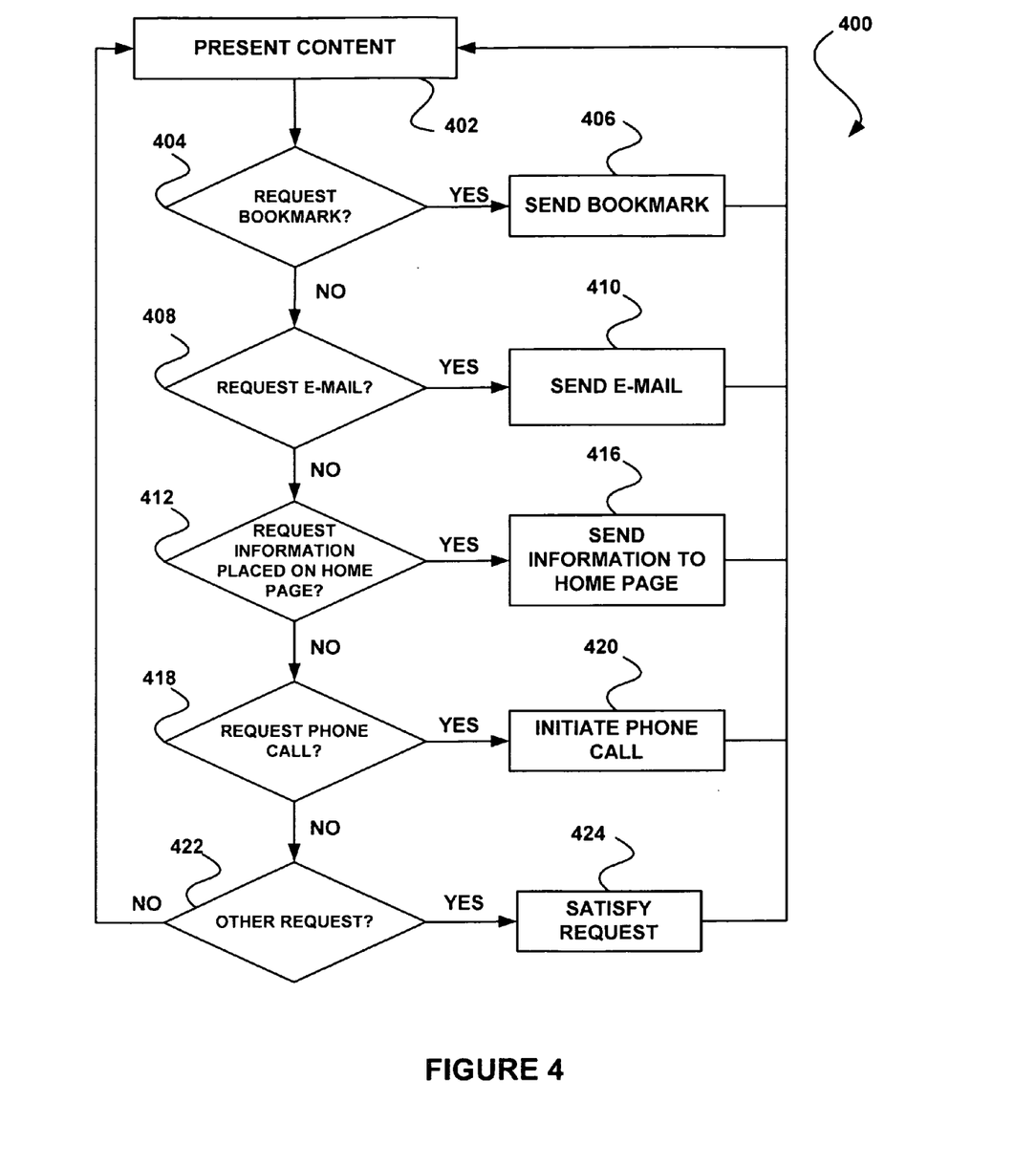
FIG. 4 shows a method for requesting and receiving information associated with content, in accordance with one embodiment.

FIG. 4 shows a method 400 for requesting and receiving information associated with content, in accordance with one embodiment. As an option, the method 400 may be implemented in the context of the details of FIGS. 1-3. Of course, however, the method 400 may be carried out in any desired environment. Again, the aforementioned definitions may equally apply to the description below.

As shown in operation 402, content is presented to a user. It is then determined in decision 404 whether a request has been made by the user for a bookmark associated with the content be placed on a browser and/or an on-line bookmarks list maintained by the user. If it is determined in decision 404 that such a request has been made, the bookmark is placed on the browser and/or the on-line bookmarks list maintained by the user, as shown in operation 406. The method 400 then returns to the current content being presented.

If, however, it is determined in decision 404 that such a request has not been made, it is determined in decision 408 whether a request has been made by the user for an e-mail containing information associated with the displayed content. If it is determined in decision 408 that such a request has been made, the e-mail with the requested information is sent to the user, as shown in operation 410. The method 400 then returns to the current content being presented.

If, however, it is determined in decision 408 that such a request has not been made, it is determined in decision 412 whether a request has been made by the user for information associated with the content to be placed on a web page. If it is determined in decision 412 that such a request has been made, the information is placed on the designated web page, as shown in operation 416. The method 400 then returns to the current content being presented.

If, however, it is determined in decision 412 that such a request has not been made, it is determined in decision 418 whether a request has been made by the user for a phone call from a representative associated with the content. If it is determined in decision 418 that such a request has been made, a phone call is initiated between the user and the representative, as shown in operation 420. The method 400 then returns to the current content being presented.

If, however, it is determined in decision 418 that such a request has not been made, it is determined in decision 422 whether any additional request has been made by the user. If it is determined in decision 422 that such a request has been made, the request is satisfied, as shown in operation 424. The method 400 then returns to the current content being presented. In this way, any number of user requests may be satisfied with respect to presented content.

Figure 5:
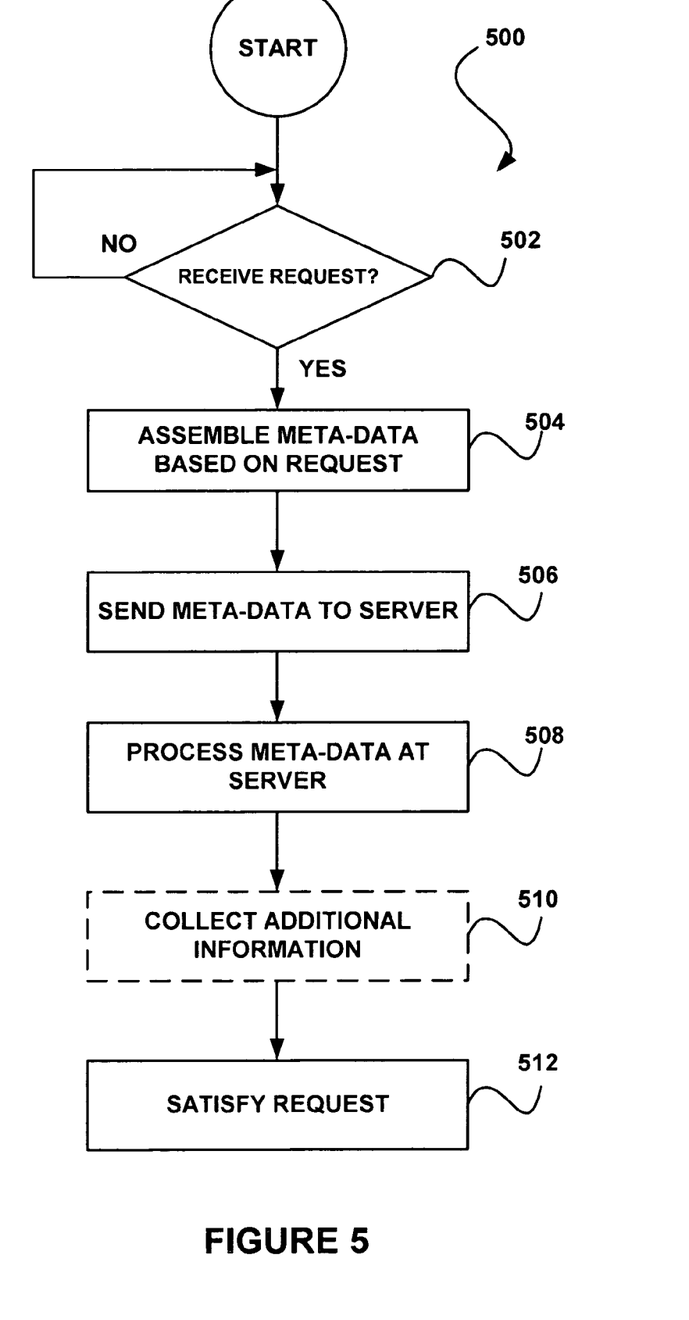
FIG. 5 shows a method for processing a request for information associated with content, in accordance with another embodiment.

FIG. 5 shows a method 500 for processing a request for information associated with content, in accordance with another embodiment. As an option, the method 500 may be implemented in the context of the details of FIGS. 1-4. Of course, however, the method 500 may be carried out in any desired environment. Again, the aforementioned definitions may equally apply to the description below.

As shown, it is decided in decision 502 whether a request for information associated with displayed content has been received. If it is determined in decision 502 that a request has been made, meta-data is assembled based on the request. Note operation 504. The meta-data may be assembled at the device displaying the content, for example. The meta-data is then sent to a server, as shown in operation 506.

The server processes the meta-data in operation 508 by identifying the requested information. As an option, the server may also collect additional information, such as information relevant to the displayed content but not specifically requested, as in operation 510. The requested information and/or the additional information may then be utilized to satisfy the request. Note operation 512. Such request may be satisfied by sending the requested information and/or additional information to a user requesting the information.

Of course, the various operations of the methods 400 and 500 of FIGS. 4 and 5, respectively, may incorporate any of the relevant details set forth in the context of FIGS. 1-3.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    presenting content utilizing a first device;
    receiving a request for information associated with the content utilizing the first device, the request for information received at a server;
    sending the requested information to a second device;
    generating meta-data at the first device in response to the request for information;
    receiving the meta-data at the server, where the meta-data includes the request for information;
    identifying the requested information at the server utilizing the meta-data;
    sending the requested information from the server to the second device; and
    identifying relevant information that was not requested;
    wherein the sending of the requested information to the second device comprises sending a link to the requested information to the second device;
    wherein the sending of the requested information to the second device further comprises sending the link to the requested information for storage in association with a web browser;
    wherein the identifying the requested information further comprises enhancing the meta-data at the server utilizing additional information received from at least one of an Internet search result, a database query and a user submission;
    wherein the relevant information is utilized to enhance the requested information based on at least one of a default configuration, a user profile and data included in the meta-data.

2. The method of claim 1, wherein the first device and the second device are connected utilizing a network.

3. The method of claim 1, wherein a copy of the requested information is stored in the first device.

4. The method of claim 1, wherein the content is interactive content.

5. The method of claim 1, wherein the additional information is stored on the server.

6. The method of claim 1, wherein the requested information is sent to the second device utilizing electronic mail.

7. The method of claim 1, wherein the requested information is sent to the second device utilizing a short message service (SMS).

8. The method of claim 1, wherein the requested information includes an extensible markup language (XML) file.

9. The method of claim 1, wherein the meta-data includes at least one of an information code, a content title, a time, a model of the first device, a user configuration, and user contact information.

10. The method of claim 1, wherein the meta-data includes an information code, a content title, a time, a model of the first device, a user configuration, and user contact information.

11. The method of claim 1, wherein the presenting of the content utilizing the first device includes at least one of displaying the content utilizing the first device and presenting the content via audio utilizing the first device.

12. The method of claim 1, wherein the second device retrieves the requested information utilizing the link to the requested information.

13. The method of claim 1, wherein the request includes formatting information identifying a format in which the information is to be received and the format includes a uniform resource locator (URL) link to the information.

14. A computer program product embodied on a tangible computer readable medium, comprising:
    computer code for presenting content utilizing a first device;
    computer code for receiving a request for information associated with the content utilizing the first device, the request for information received at a server;
    computer code for sending the requested information to a second device;
    computer code for generating meta-data at the first device in response to the request for information;
    computer code for receiving the meta-data at the server, where the meta-data includes the request for information;
    computer code for identifying the requested information at the server utilizing the meta-data;
    computer code for sending the requested information from the server to the second device; and
    computer code for identifying relevant information that was not requested;
    wherein the computer program product is operable such that the sending of the requested information to the second device comprises sending a link to the requested information to the second device;
    wherein the computer program product is operable such that the sending of the requested information to the second device further comprises sending the link to the requested information for storage in association with a web browser;
    wherein the computer program product is operable such that identifying the requested information further comprises enhancing the meta-data at the server utilizing additional information received from at least one of an Internet search result, a database query and a user submission;
    wherein the computer program product is operable such that the relevant information is utilized to enhance the requested information based on at least one of a default configuration, a user profile and data included in the meta-data.

15. A computer-implemented method, comprising:
    presenting content utilizing a first device;
    receiving a request for a contact associated with the content utilizing the first device, the request for the contact received at a server;
    establishing contact with a second device in regards to the content, in response to the request;
    generating meta-data at the first device in response to the request for the contact;

receiving the meta-data at the server, where the meta-data includes the request for the contact;

identifying the requested contact at the server utilizing the meta-data; and identifying relevant information that was not requested;

wherein the establishing of the contact with the second device comprises sending a link to the requested contact associated with the content to the second device;

wherein the establishing of the contact with the second device further comprises sending the link to the requested contact associated with the content for storage in association with a web browser;

wherein the identifying the requested contact further comprises enhancing the meta-data at the server utilizing additional information received from at least one of an Internet search result, a database query and a user submission;

wherein the relevant information is utilized to enhance the contact based on at least one of a default configuration, a user profile and data included in the meta-data.

* * * * *